July 29, 1969         S. ABRAHAM         3,457,901

PORTABLE AND ADJUSTABLE PLATFORM EXTENDER FOR BARNS

Filed June 6, 1967         3 Sheets-Sheet 1

INVENTOR.
SAMUEL ABRAHAM

BY

ATTORNEYS

July 29, 1969 S. ABRAHAM 3,457,901
PORTABLE AND ADJUSTABLE PLATFORM EXTENDER FOR BARNS
Filed June 6, 1967 3 Sheets-Sheet 2

INVENTOR.
SAMUEL ABRAHAM
BY
ATTORNEYS

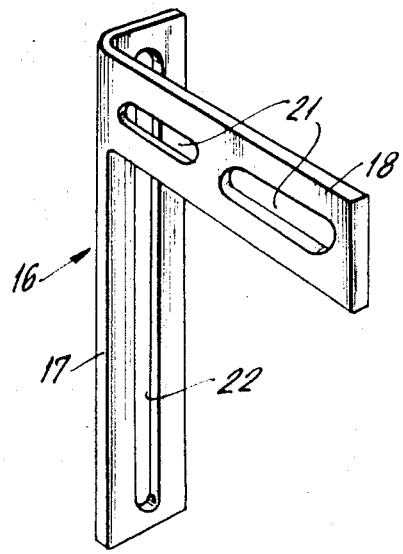
FIG. 6
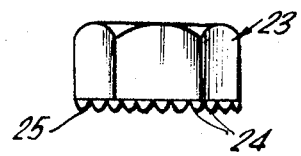
FIG. 6a
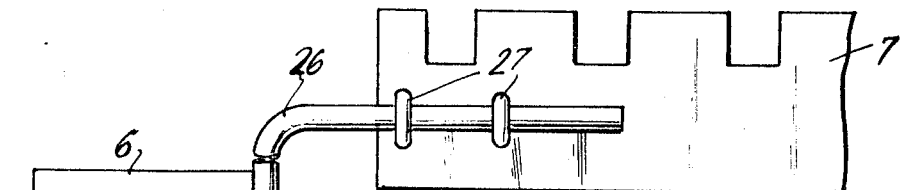
FIG. 7
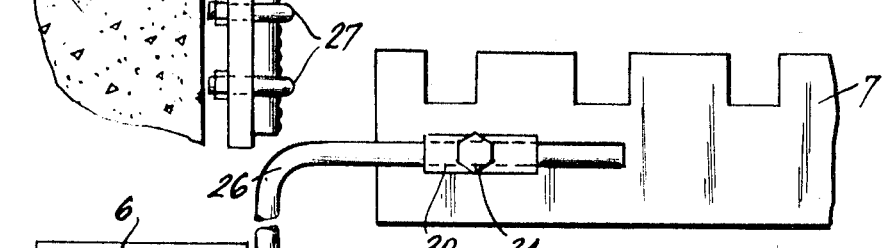
FIG. 8
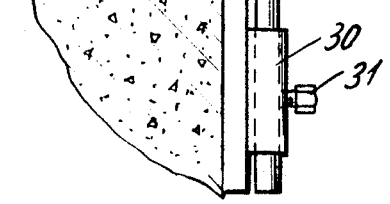

United States Patent Office 3,457,901
Patented July 29, 1969

3,457,901
PORTABLE AND ADJUSTABLE PLATFORM EXTENDER FOR BARNS
Samuel Abraham, 72 Commonwealth Ave.,
Middletown, N.Y. 10940
Filed June 6, 1967, Ser. No. 643,964
Int. Cl. A01j 1/00; A01k 1/00
U.S. Cl. 119—28                                8 Claims

ABSTRACT OF THE DISCLOSURE

The present invention relates to a portable and adjustable platform extender for barns, bridging barn gutters wherein vertical or horizontal adjustment and preferably vertical and horizontal adjustment for the platform extender is provided by the interposition of right angle linking means between the supporting surface of the platform extender and one of the longitudinal edges of the platform extender, the linking means adjustably mounted, one end of the linking means affixed to the longitudinal edge portion of the platform extender and the other end of the linking means affixed to the supporting surface of the platform extender. The supporting surface of the platform extender preferably includes a plurality of spaced apart bearing bars having flat vertical sides.

---

The present invention relates to a portable and adjustable platform extender for barns.

Many of the barns used today for farm animals were constructed many years ago and the stall areas or platforms for the animals are oftentimes unsuitable or inadequate for today's purposes and uses.

For example, with the exception of certain southern states, cows are confined from about October to May on a cement platform approximately 48 inches wide and 60 inches long. A gutter directly behind the platform serves as a repository for the urinary and intestial discharges of the animal. In many instances the platform is higher than the barn flooring which abuts the other side of the gutter so that the environment for the cow during its period of confinement on the platform is one of an elevated platform with a gutter directly behind the platform.

The comparatively small area presented by the platform may be troublesome since the cramped quarters afforded the animal may be a source of swollen joints, udder injury and other health problems since almost no room for movement is afforded the animal other than to back up within the gutter. In lying down or backing up the rear quarters of the cow comes in contact either with the edges of the platform and/or the gutter and in many instances the udder itself bears upon the platform edge presenting a situation wherein injury to the udder is highly probable.

Even on larger platforms there is additionally a tendency, especially where cows are confined for extended periods of time, for the cow to step backward within the gutter which soils the animal and presents a problem of infection from the waste in the gutter. The waste is thereby transferred to the cow's body soiling the animal, and preventing milking of the cow until the animal is cleaned.

In more recent years these problems have been accentuated since through selection and breeding the cows of today are larger and most older barns were built for a smaller breed of cows.

Additionally, many barns in use today were "modernized" in an evolutionary manner whereby platforms originally of dirt and then wood are now of cement construction and the barn flooring and the platforms are now on two different levels.

An obvious solution to the foregoing problems would be to rebuild all such barns completely, however it is just as obvious that such a procedure involves a large expenditure. Furthermore such rebuilding would not provide for animals of differing sizes. The uniformity, even of enlarged platforms provides a problem of animal placement with respect to the gutter and a platform which is too large for a particular cow would cause a build up of the cow's waste material on the platform instead of its deposit within the gutters.

According to the present invention a portable and adjustable platform extender is provided adaptable for use over existing gutters to extend the platform horizontally according to the needs of a particular animal even where the barn floor is not on the same level as the platform without relocation of the gutter and is readily movable and so constructed as to allow for the passage of eliminated waste therethrough and additionally allows for the operation of existing mechanical gutter cleaners.

By provision of both vertical and horizontal adjustment, variations in gutter width and/or the height differential between barn floor and platform are overcome and the device of the present invention may be employed for specific platforms within a barn without the need to either rebuild a part of or an entire barn or regrade the flooring of the barn. In this manner width variations of a gutter in the same barn as well as height variations present no problem for use. Height adjustment to a level equal to the platform level is both desirable in eliminating the drop-off at the edge of the platform and even more particularly prevents the cow from slipping along an otherwise inclined plane.

The platform extender of the present invention may therefore be selectively employed for individual animals or for a plurality of animals affording the animals more room, preventing the animal from steeping into the gutter's contents and the sanitary and health problems attendant thereto, the platform extender being readily movable within the barn for use with selected platform areas.

By provision of substantially vertical sides on the longitudinal bearing bars horizontal flat surfaces have been minimized and the passage therethrough of fecal material is facilitated. Additionally the spaced screening off of the gutter by the platform extender of the present invention prevents the cow's tail from contact with the gutter contents when the cow is lying down, a problem heretofore encountered even where large platforms are used.

Although such novel feature or features believed to be characteristic of the invention are pointed out in the claims, the invention and the manner in which it may be carried out may be further understood by reference to the description following and the accompanying drawings.

FIG. 6 is a perspective view of an alternative adjusting bracket of the present invention.

FIG. 6a is a side elevation of an affixing nut of the present invention.

FIG. 7 is a detailed section of alternate adjusting means of the present invention.

FIG. 8 is a detailed section of another embodiment of the present invention.

Referring now to the figures in greater detail, where like reference numbers denote like parts in the various figures.

Figure 1:
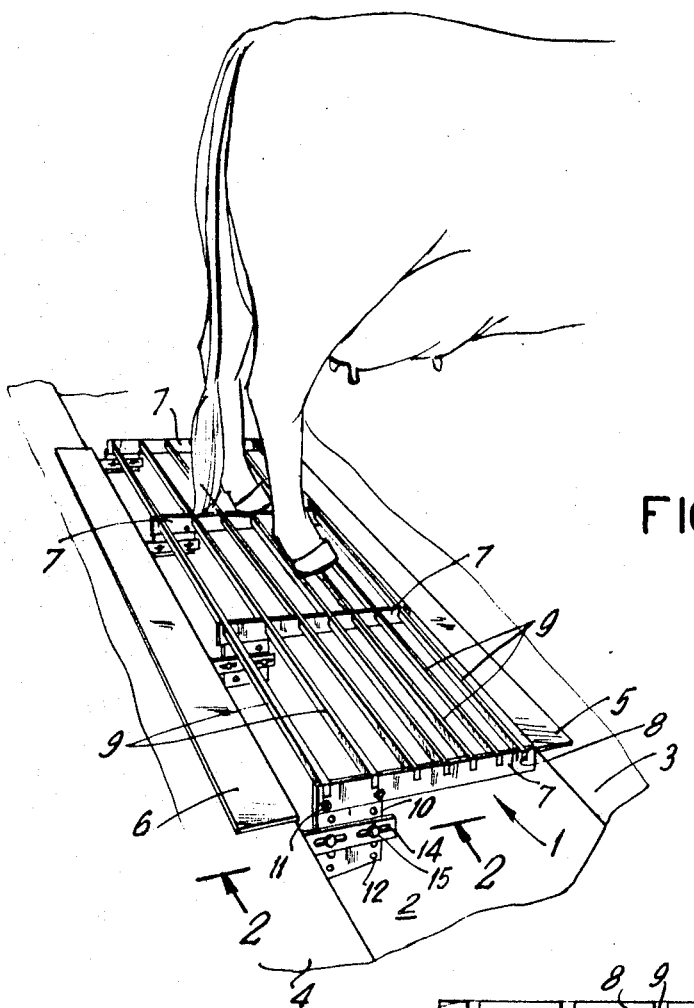
FIG. 1 is a perspective view of a platform extender of the present invention installed over a cow barn gutter.

As shown in FIG. 1 the platform extender 1 of the present invention is adapted to bridge the gutter 2 between the platform 3 and the barn floor or walkway 4.

The platform extender 1 generally comprises a horizontally disposed substantially right angle member 5 with at least two cross members 7 extending outward from the outer wall of the vertical side of the right angle member 5. A plurality of cross members 7 may be provided for additional strength if desired.

Figure 4:
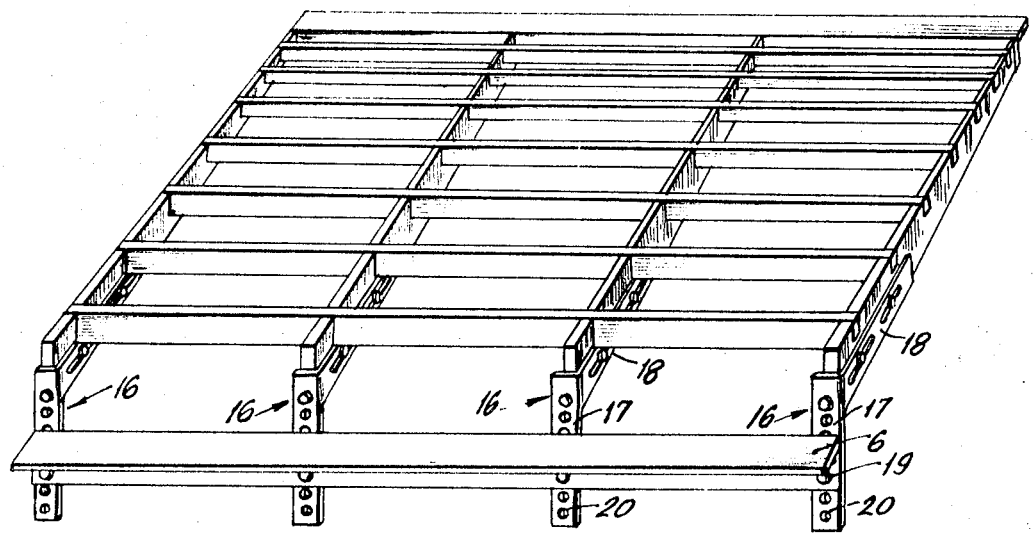
FIG. 4 is a perspective view of another embodiment of the present invention.

Substantially vertical slots or grooves 8 are provided along the length of the cross members 7 and a series of bearing bars 9 are disposed and secured therein, the bearing bars 9 running parallel to the right angle member 5 and are spaced apart so that the distance between any two bars 9 is not greater than the size of an animal hoof, yet providing a space therebetween large enough to allow for the passage therethrough of the animal's waste material. As shown in FIG. 4 it is preferable that the bearing bars 9 be of a generally rectangular configuration with one of its narrowest sides facing upward and substantially level with the top of the cross members 7. It has been found that such positioning provides a substantially flat upper surface on the platform extender 1 and further provides flat vertical surfaces on the bars 9 so as to eliminate as much as possible the areas where the evacuated waste materials can lodge or accumulate.

An adjustable bar 6 is adjustably affixed to the end portion of the cross members 7, the adjustable bar 6 preferably a right angle, horizontally disposed member similar to the right angle member 5.

Vertical and horizontal adjustment of the platform extender 1 is effected by the interposition between the adjustable bar 6 and the end portions of the cross members 7 of adjustment members.

Figure 2:
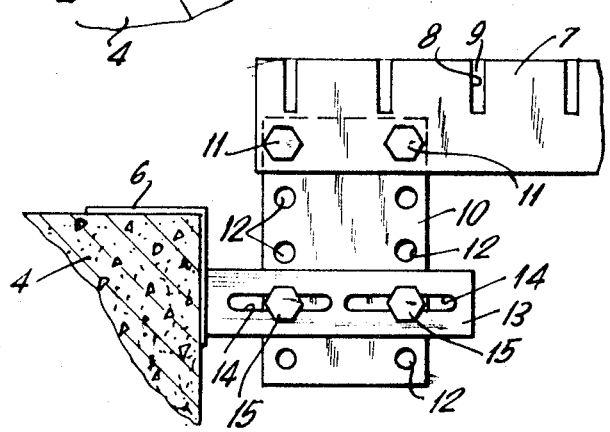
FIG. 2 is a section view taken along lines 2—2 of FIG. 1.

As shown in FIG. 2, a plate 10 is vertically affixed to the end portions of the cross member 7 by conventional means such as bolts 11, the plate 10 having a series of, and preferably two parallel rows of, vertically spaced apart openings 12 therethrough. As shown in FIG. 2 it is preferable that the upper edge of the plate 10 terminate below the lowest point of the grooves 8 on the cross members 7 so as not to interfere with the bearing bars 9.

A horizontal bar 13 permanently affixed to the outer side of the vertical wall of the adjustable bar 6 extends outward therefrom so as to lie in an intersecting plane with the plate 10. The horizontal bar 13 is provided with at least one elongated horizontal slot 14 along its length. By affixation such as by use of bolts 15 through slot 14 and selected openings 12 and securing the same both vertical and horizontal adjustment is accomplished, the adjustable bar 6 being positioned the selected distance from the ends of the cross members 7 desired and the height thereof with respect to the remaining portions of the platform extender 1 thereby regulated.

Figure 3:
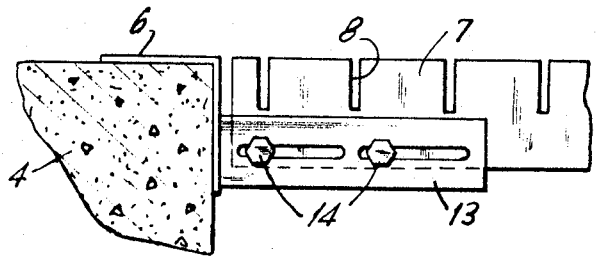
FIG. 3 is a section view of the embodiment of FIG. 2 with the vertical adjustment plate removed.

As shown in FIG. 3 wherein a given barn or in a given area of a barn the walkway 4 and platform 3 are on the same level, the plate 10 may be dispensed with, the horizontal bar 13 being directly affixed through slots 14 to the cross members 7.

In lieu of a permanently affixed horizontal bar 13 and plate 10 arrangement both horizontal and vertical adjustment may be provided through the use of right angle bracket 16 such as shown in FIGS. 4-6a, the right angle bracket 16 having vertical portion 17 and a horizontal portion 18, the horizontal portion 18 preferably extending at a right angle from the upper side of the vertical portion 17.

Figure 5:
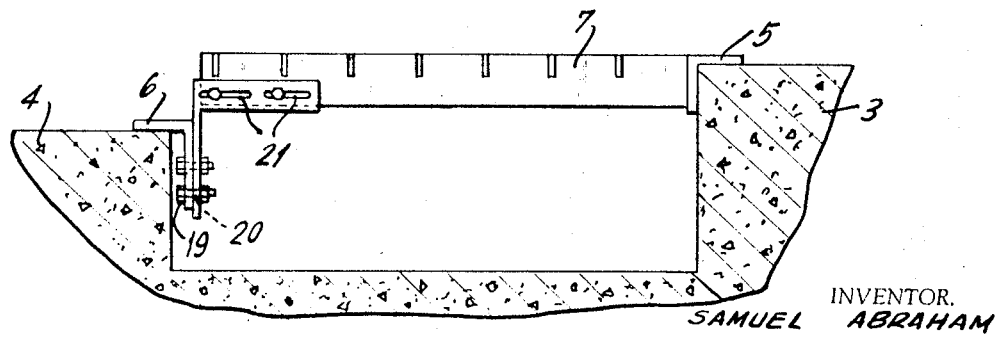
FIG. 5 is a side elevation of the embodiment of FIG. 4 mounted over a gutter.

As shown in FIGS. 4 and 5 a series of openings 19 may be provided vertically spaced apart on the vertical side of the adjustable bar 6. A series of openings or slots or a combination thereof may be provided on the right angle bracket 16, such as the openings 20 on the vertical portion 17 and slots 21 on the horizontal portion 18 illustrated in FIGS. 4 and 5, whereby vertical adjustment is accomplished by affixation of the vertical portion 17 of the right angle bracket 16 through selected openings 19, 20 and horizontal adjustment by affixation of the horizontal portion 18 through slots 21 through openings provided on the cross member 7.

Greater flexibility with respect to selective positioning is afforded where, as shown in FIG. 6, the vertical portion 17 of the right angle bracket 16 is provided with an elongated vertical slot 22.

By the provision of slots 21, 22 in lieu of spaced apart openings the platform extender 1 may be positioned with greater accuracy since minor variations in levels and distances can be offset by selective positioning. Where slots 21, 22 are employed the use of a nut 23 such as shown in FIG. 6a is preferable, the nut 23 having serrations 24 on its head-side 25 which grip the right angle bracket 16 when affixed and act to deter slippage.

As shown in FIGS. 7 and 8 the number of openings and the mating of the same can be reduced to a minimum or even eliminated altogether by provision of a right angle pipe-like angulated member 26 adjustably affixed to both the cross member 7 and the adjustable bar 6.

U-bolts 27 may be provided as the retaining means with the curved portion of the U adapted to wrap around the angulated member 26. To deter possible slippage, if desired the vertical portion 28 of the member 26 may have notches 29 thereon, with the curved portion of the U-bolt 27 abutting within the notches when fastened.

As shown in FIG. 8 hollow tubes 30 may be permanently affixed to both the adjustable bar 6 and the cross member 7, the internal configuration of the tubes 30 being substantially the same although slightly larger than the cross sectional shape of the angulated member 26. The tubes 30 are positioned on the adjustable bar 6 and cross member 7 so as to provide a hollow receptacle for the end lengths of the angulated member 26. A set screw 31 provided on the periphery of each tube is adapted to be screwed inward of the tube 30 and lock the angulated member in fixed position therein.

In use, the platform extender 1 is installed with the lip of the right angle member 5 positioned along the edge of the platform 3, and the lip of the adjustable bar 6 positioned along the edge of the walkway 4 with vertical and horizontal adjustment made in the manner herebefore described.

In such manner the platform extender 1 can be adjusted to bridge the gutter 2 regardless of the difference in the width and height of the sides of the gutter 2.

Having thus described certain forms of the invention in some detail, what is claimed is:

1. A portable and adjustable platform extender for barns comprising, a first longitudinal member adapted to rest on one of the edges of said gutter, a supporting surface having spaced apart openings therethrough said supporting surface horizontally mounted to said first longitudinal member, a second longitudinal member adapted to rest on the opposite edge of said gutter, linking means interposed between said second longitudinal member and said supporting surface, said linking means having a horizontal portion and a vertical portion, said horizontal and vertical portions in right angle relationship, and adjustment means for selectively positioning said horizontal and vertical portions.

2. The apparatus of claim 1 wherein said supporting surface includes a plurality of cross members extending horizontally and at a right angle to said first longitudinal member and a plurality of spaced apart bearing bears mounted to said cross members in parallel relationship to said first longitudinal member, said cross bars having substantially flat vertical surfaces.

3. The apparatus as claimed in claim 2 wherein said cross members include a plurality of spaced apart grooves along their upper edges, said bearing bars mounted to said cross members within said grooves.

4. The invention of claim 3 wherein each said bearing bar is a flat elongated substantially rectangular member, each said bearing bar mounted to said cross members with one of the narrower sides of said rectangular member facing upward.

5. The apparatus of claim 1 wherein said horizontal portion comprises an elongated member having at least one opening along its length, said vertical portion comprises an elongated member having at least one opening along its length, and said adjustment means joins said portions through said openings.

6. The apparatus of claim 1 wherein said horizontal portion comprises an elongated member having at least one opening along its length, said vertical portion comprises an elongated member having at least one opening along its length, said adjustment means joining said vertical portion to said second longitudinal member through said vertical portion opening and said horizontal portion to said supporting surface through said horizontal portion opening.

7. The apparatus of claim 1 wherein said adjustment means comprise a first tube vertically mounted to said second longitudinal member, a second tube horizontally mounted to said supporting surface, each said tube adapted to receive a portion of said linking means therein and locking means on the periphery of each said tube actuatable to a position inward of each said tube to lock said linking means therein.

8. The apparatus of claim 1 wherein said adjustment means comprises at least one U-bolt adapted to hold a portion of said linking means within said U.

References Cited

UNITED STATES PATENTS

| 1,402,613 | 1/1922 | Hotz | 119—15 |
| 2,856,897 | 10/1958 | Galinsky | 119—22 |
| 2,868,169 | 1/1959 | Schriever et al. | 119—28 |

HUGH R. CHAMBLEE, Primary Examiner